(12) United States Patent
DeLuca et al.

(10) Patent No.: US 9,595,020 B2
(45) Date of Patent: Mar. 14, 2017

(54) DYNAMIC MEDIA CAPTIONS IN A SOCIAL NETWORK ENVIRONMENT

(75) Inventors: Lisa Seacat DeLuca, San Francisco, CA (US); Jenny S. Li, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 664 days.

(21) Appl. No.: 13/421,779

(22) Filed: Mar. 15, 2012

(65) Prior Publication Data
US 2013/0246040 A1 Sep. 19, 2013

(51) Int. Cl.
*G06Q 10/10* (2012.01)
*G06Q 50/00* (2012.01)

(52) U.S. Cl.
CPC ............ *G06Q 10/10* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 8,595,146 B1 * | 11/2013 | Liew | H04L 65/403 705/319 |
| 2005/0091338 A1 * | 4/2005 | de la Huerga | A61J 1/1437 709/217 |
| 2005/0177385 A1 * | 8/2005 | Hull | G06Q 10/10 705/319 |
| 2007/0033392 A1 * | 2/2007 | Ganesan | H04L 9/0822 713/155 |

(Continued)

FOREIGN PATENT DOCUMENTS

| JP | 2008097238 A | 4/2008 |
|---|---|---|
| JP | 2008177752 A | 7/2008 |

(Continued)

OTHER PUBLICATIONS

Rabbath, M.-et al.; "Semantic photo books: leveraging blogs and social blogs and social media for photo book creation";Proceedings of SPIE,Int'l Society Optical Engr;V.7879;all pages; 2011.

(Continued)

*Primary Examiner* — Kathleen Palavecino
*Assistant Examiner* — Andrew Whitaker
(74) *Attorney, Agent, or Firm* — Law Offices of Ira D. Blecker, P.C.

(57) ABSTRACT

A dynamic media caption apparatus and method in a social network environment. Included is a user interface to define syntax and distribution rules for a media caption in a social network; a distribution rules engine to understand the syntax and distribution rules defined in the user interface for the media caption and output a media caption that is customized according to the distribution rules; and a distribution manager to translate the customized media caption output by the distribution rules engine to a language understandable by the social network, generate the customized media caption in the language understandable by the social network and output the translated customized media caption to the social network, the customized media caption changing according to the distribution rules and a relationship to the user of a viewer of the media caption on the social network.

20 Claims, 2 Drawing Sheets

(56) References Cited

U.S. PATENT DOCUMENTS

| | | | |
|---|---|---|---|
| 2008/0082922 A1 | 4/2008 | Biniak et al. | |
| 2008/0091526 A1 | 4/2008 | Shoemaker | |
| 2008/0091723 A1* | 4/2008 | Zuckerberg | G06Q 30/02 |
| 2009/0043789 A1* | 2/2009 | Gupta | G06F 17/30029 |
| 2009/0070334 A1* | 3/2009 | Callahan | G06F 21/604 |
| 2009/0199100 A1* | 8/2009 | Hwang | G11B 27/32 715/723 |
| 2009/0307345 A1* | 12/2009 | Carter | G06Q 30/02 709/224 |
| 2010/0058207 A1 | 3/2010 | Hamey et al. | |
| 2011/0035284 A1* | 2/2011 | Moshfeghi | G06Q 30/02 705/14.58 |
| 2011/0225481 A1* | 9/2011 | Zuckerberg | G06F 17/30265 715/205 |
| 2011/0231747 A1* | 9/2011 | Zuckerberg | G06F 17/30265 715/206 |
| 2012/0324002 A1* | 12/2012 | Chen | G06F 17/30274 709/204 |
| 2013/0110631 A1* | 5/2013 | Mitchell | H04W 4/185 705/14.58 |
| 2014/0006914 A1* | 1/2014 | Visconsi | G06F 17/211 715/202 |

FOREIGN PATENT DOCUMENTS

| | | |
|---|---|---|
| JP | 2008283449 A | 11/2008 |
| JP | 2009212997 A | 9/2009 |
| WO | WO2010093856 | 8/2010 |

OTHER PUBLICATIONS

Maher, ML.; "Computationally-Enabled Social and Collective Intelligence: Research Challenges"; Retrieved from the Internet:< URL: http://www.public.asu.edu/~huanliu/sbp09/Presentations/invited%20speakers/SBP09%20Maher.pdf>, all pages; 2009.
(PCT/IB2013/051963), ISR and WO, Jul. 16, 2013, all pages.

* cited by examiner

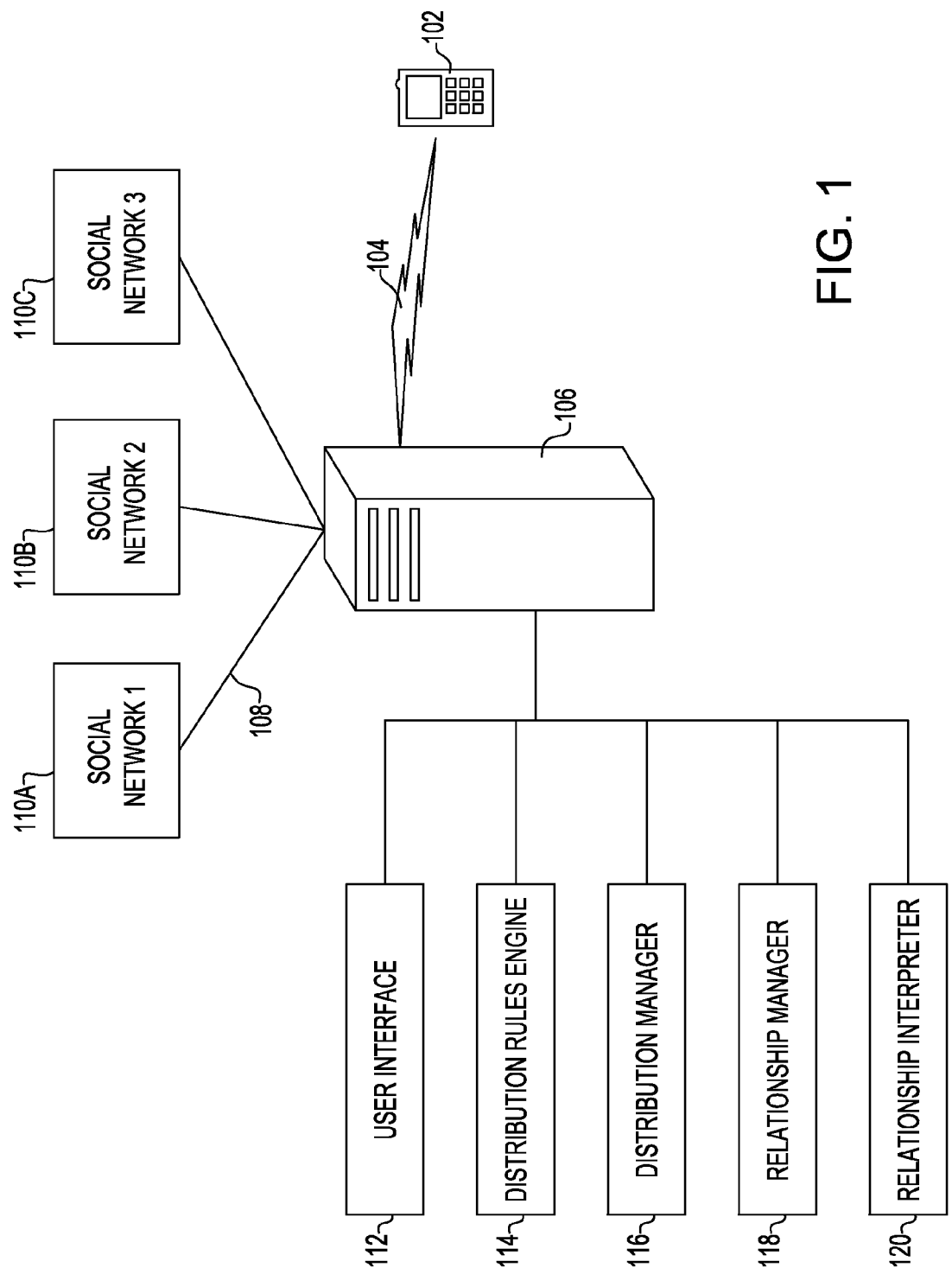

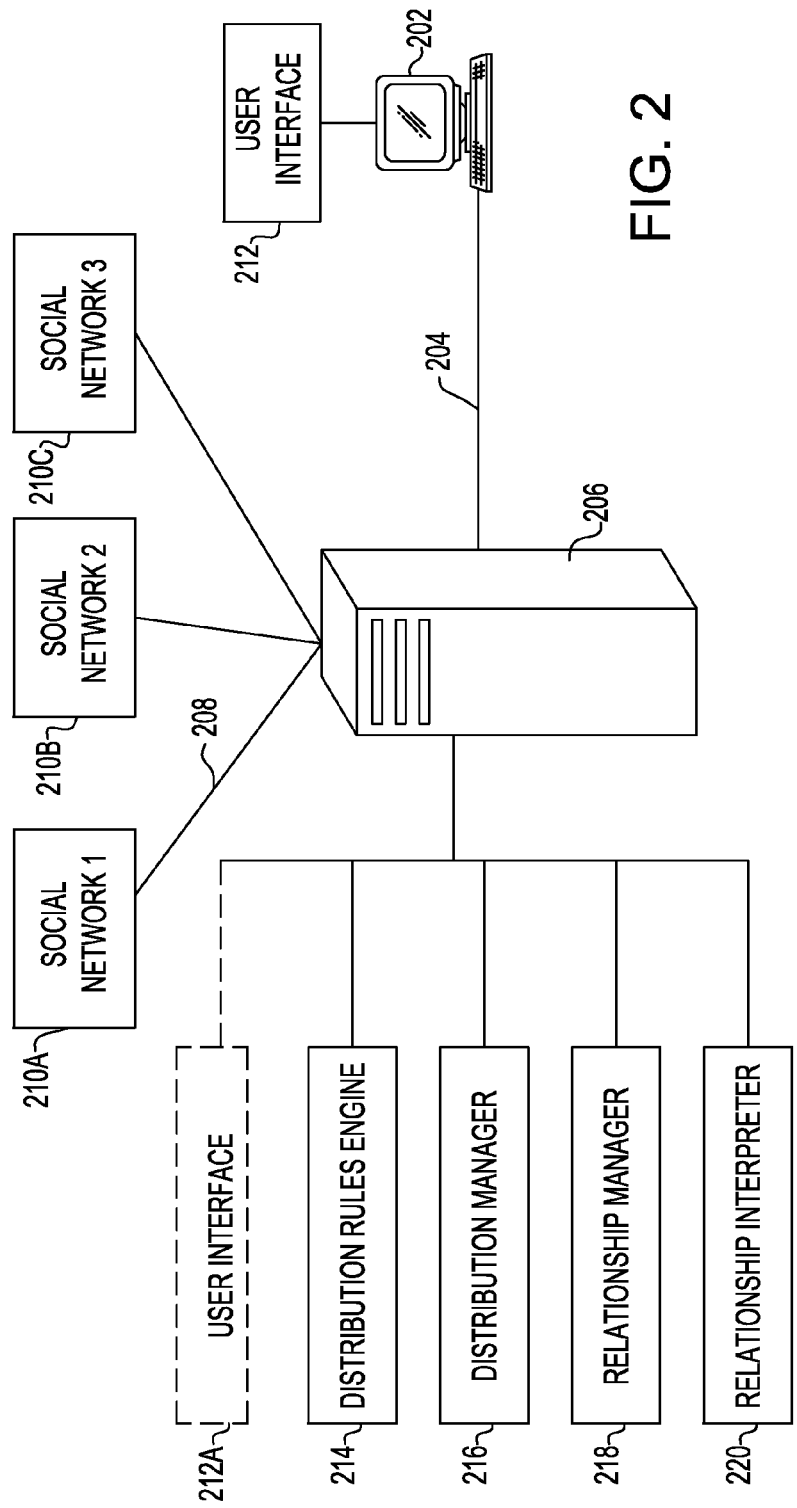

DYNAMIC MEDIA CAPTIONS IN A SOCIAL NETWORK ENVIRONMENT

BACKGROUND

The present invention relates to media that is shared on a social network and, more particularly, relates to customizing the captions of the media according to the viewer of the media and the viewer of the captions.

In a social network environment, users may add groups of people with different types of relationships to their network, such as family, friends, coworkers, acquaintances etc. These groups may be further grouped into groups of friends, groups of coworkers and so on. The closeness of a relationship between a user and each group in his/her network may vary. Therefore, the user may share more information with one group over another group. The existing technology allows a user to define groups and designate a message to a particular group.

With respect to media such as digital photographs, video and links, a user may set the privacy settings on the social network so that the media may be shared with all groups or only with some groups such as family and friends but not coworkers. If the media has a caption with the media, the caption may also be shared with the media according to the privacy settings on the social network.

BRIEF SUMMARY

The various advantages and purposes of the exemplary embodiments as described above and hereafter are achieved by providing, according to a first aspect of the exemplary embodiments, a dynamic media caption apparatus in a social network environment including: a user interface to define syntax and distribution rules for a media caption in a social network; a distribution rules engine to understand the syntax and distribution rules defined in the user interface for the media caption and output a media caption that is customized according to the distribution rules; and a distribution manager to translate the customized media caption output by the distribution rules engine to a language understandable by the social network, generate the customized media caption in the language understandable by the social network and output the translated customized media caption to the social network, the customized media caption changing according to the distribution rules and a relationship to the user of a viewer of the media caption on the social network. The apparatus is implemented by one or more computing devices.

According to a second aspect of the exemplary embodiments, there is provided a method of creating a dynamic media caption in a social network environment including: providing a user interface to define syntax and distribution rules in the user interface for a media caption in a social network; providing a distribution rules engine; understanding by the distribution rules engine the syntax and distribution rules defined in the user interface for the media caption and outputting a media caption that is customized according to the distribution rules; providing a distribution manager; and translating by the distribution manager the customized media caption output by the distribution rules engine to a language understandable by the social network, generating the customized media caption in the language understandable by the social network and outputting the translated customized media caption to the social network, the customized media caption changing according to the distribution rules and a relationship to the user of a viewer of the media caption on the social network. The method is implemented by one or more computing devices.

According to a third aspect of the exemplary embodiments, there is provided a method of creating a dynamic media caption service for a user using a social network including: providing a user interface to define syntax and distribution rules in the user interface accessible by a user in connection with a media caption in a social network; receiving by the user interface a media caption customized by the user using the syntax and distribution rules in the user interface; providing a distribution rules engine; receiving by the distribution rules engine the customized caption and understanding by the distribution rules engine the syntax and distribution rules defined in the user interface for the customized media caption and outputting the customized media caption that is customized by the user according to the distribution rules; providing a distribution manager; and receiving by the distribution manager and translating by the distribution manager the customized media caption output by the distribution rules engine to a language understandable by the social network, generating the customized media caption in the language understandable by the social network and outputting the translated customized media caption to the social network, the customized media caption changing according to the distribution rules and a relationship to the user of a viewer of the media caption on the social network. The method is implemented by one or more computing devices.

According to a fourth aspect of the exemplary embodiments, there is provided a computer program product for creating a dynamic media caption in a social network environment. The computer program product includes a computer readable storage medium having a computer readable program code embodied therewith. The computer readable program code including: computer readable program code configured to provide a user interface to define syntax and distribution rules in the user interface for a media caption in a social network; computer readable program code configured to provide a distribution rules engine; computer readable program code configured to understand by the distribution rules engine the syntax and distribution rules defined in the user interface for the media caption and computer readable program code configured to output a media caption that is customized according to the distribution rules; computer readable program code configured to provide a distribution manager; and computer readable program code configured to translate by the distribution manager the customized media caption output by the distribution rules engine to a language understandable by the social network, computer readable program code configured to generate the customized media caption in the language understandable by the social network and computer readable program code configured to output the translated customized media caption to the social network, the customized media caption changing according to the distribution rules and a relationship to the user of a viewer of the media caption on the social network.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be under- FIG. 1 illustrates of an arrangement of a dynamic media caption apparatus according to a first exemplary embodiment.

FIG. 2 illustrates of an arrangement of a dynamic media caption apparatus according to a second exemplary embodiment.

FIG. 3 is a block diagram of a computing device for practicing the exemplary embodiments.

DETAILED DESCRIPTION

While the present technology allows a user to add a media caption viewable according to the privacy settings of the social network, there is no opportunity to customize the caption of the media according to the viewer. For example, if the user wants the caption to read one way for all viewers but a different way for certain groups of viewers, this may not be accomplished with existing technology.

In the exemplary embodiments, a user may be enabled to share the same media file with people in his/her network with customized captions. Depending on the closeness in a relationship, the user may disclose more information to his/her family and close friends while disclosing very neutral information to his/her coworkers or pure acquaintances.

According to the exemplary embodiments, the user is enabled to post media, such as digital pictures, videos and links, once with the people the user would like to share with, and customize the caption so that closer friends may view different text compared to coworkers or others that are allowed to view the media.

As an illustrative example, the user may post on the social network a picture of the user in a restaurant. For coworkers, the caption may read "having lunch at Italiano Restaurant". For close friends, the caption may read "having lunch at Italiano Restaurant with a new date :)". The media is the same but the caption text has been customized according to the viewer of the media. That is, the exemplary embodiments may generate dynamic media captions based on the same media file.

The exemplary embodiments may be implemented by providing a user interface, a distribution rules engine and a distribution manager as the main components of a dynamic media caption apparatus.

The user interface defines syntax and distribution rules for a media caption in a social network.

The distribution rules engine may understand the syntax and distribution rules defined by the user for the media caption.

The distribution manager translates the media caption to a language understandable by the social network.

The dynamic media caption apparatus may also include a relationship manager to manage relationships defined by users and a relationship interpreter to translate relationships between social networks.

Each of these components will now be discussed in more detail.

The user interface defines the syntax and distribution rules for a media caption in a social network. In one exemplary embodiment, the user interface may allow end users to define the syntax and distribution. In another exemplary embodiment, the user interface may have pre-defined syntax and distribution rules. In yet another exemplary embodiment, the user interface may have defined symbols and the user may assign those symbols according to the user's syntax and distribution rules.

The syntax and distribution rules need not be in a complicated programming language but should be sufficient to attain the user's objective of dynamic media captions. For purposes of illustration and not limitation, an exemplary set of syntax and distribution rules could be as follows:

Default—all text is viewable for all people in the network if not otherwise specified. That is, entering text into the user interface without any qualifiers allows all viewers to see the entire media caption.

Text following "@" is viewable for all. That is, any text following the symbol is viewable by all viewers. This symbol allows the user to set off text viewable by all viewers from text that might be viewable by a smaller group of viewers.

Text following "#" is only viewable by the family members.
Text following "~" is only viewable by friends.
Text following "&&" is only viewable by coworkers.
Text following "!x" will exclude a particular individual or groups.

It should be understood that the above syntax rules and symbols are only for illustration and other syntax rules and symbols may be used.

As an illustration of the above rules, assume that a user desires to caption a digital photo with the text "I had lunch at Italiano Restaurant with a new date. :) I had a great time." However, the user doesn't want all viewers of the photo to see the entire caption. So, the user may rewrite the caption as follows:

"I had lunch at Italiano Restaurant~with a new date. :) @ I had a great time."

Thus, according to the syntax and distribution rules, the user's friends will see the entire caption "I had lunch at Italiano Restaurant with a new date. :) I had a great time." while everyone else will see the caption "I had lunch at Italiano Restaurant. I had a great time." The caption was entered once but its content changes depending on the viewer.

In one exemplary embodiment, these syntax and distribution rules may be customized by the user, allowing the user to create rules based on the sets and subsets of groups that may fall into a particular group the user wishes to address.

The distribution rules engine understands the syntax and distribution rules defined in the user interface for the media caption, generates the media caption and outputs a coded media file containing the media caption. The media may be in a separate file or in the same file.

The distribution rules engine may use a programming language such as Java or "C" so that the media caption is in a language that may be easily translated to a language that is understood by the social network. As an example, the distribution rules engine may take the syntax from the user interface, that is, "I had lunch at Italiano Restaurant~with a new date. :) @ I had a great time.", and output the equivalent in Java or "C" or any other convenient programming language.

The coded media file represents the customized media caption according to the distribution rules as chosen or defined by the user. The coded media file contains logical decision checkpoints for each segment of the distribution. In this example, "I had lunch at Italiano Restaurant~with a new date. :) @ I had a great time.", contains three segments. The first segment contains "I had lunch at Italiano Restaurant". The second segment contains "~with a new date.:)" and the third segment contains "@ I had a great time.". As the distribution rules engine reads the whole input caption "I had lunch at Italiano Restaurant~with a new date. :) @ I had a great time." character by character from the user interface, it recognizes the special characters "@" and "~" that may be defined by the user. The distribution rules engine separates the input caption into the segments accordingly. Each segment is targeted to a list of distribution as the user has defined.

The relationship manager manages relationships defined by users in a social network. A user may define people in his social network into groups such as "friends", "coworkers", "family" etc. Defining relationships enables a user to customize his message distribution and sharing of information.

The distribution manager translates the customized media caption from the distribution rules engine to a language understandable by the social network and then outputs the translated media caption to the social network. Social networks may use a programming language such as Java, JavaScript or Ajax and the distribution manager may translate the customized media caption into this programming language. The distribution manager works with the distribution rules engine to deliver the customized caption on the user's media during run time based on the user and the viewer's relationship and the distribution rules set by the user for his caption in the user interface.

The distribution manager may query the relationship manager on the relationship between the viewers and the user in order to generate customized caption of media files that are shared by the user. For each segment of a media caption defined by the distribution rules engine, the distribution rules engine specifies the caption and the distribution target of the segment. The distribution manager may query the relationship manager for the relationship between the view and the user. For example, the viewer may be a coworker of the user. The distribution manager checks with the relationship manager if the viewer with the "coworker" relationship is allowed to view the first segment of the caption, which is "I had lunch at Italiano Restaurant". This segment is allowed to be viewed by all as a default, and the first caption segment is added to the generated caption for the "coworker" viewer. Then the distribution manager continues to read the second caption segment "~with a new date.:)". The second caption segment is only viewable by viewers with the "friends" relationship. Therefore, the "coworker" viewer is not allowed to see this segment and it is not added to his generated caption. The distribution manager continues to read the last caption segment "@ I had a great time.", which is defined to be viewable by all viewers. The last segment is added to the viewer's generated caption. The distribution manager continues until all caption segments are read and queried against the relationship of the viewer. In this example, the "coworker viewer" sees the first and the last caption segments, which is "I had lunch at Italiano Restaurant. I had a great time."

The relationship interpreter may go through a communication handshake process to establish a communication link with one or more of the social networks to translate relationships defined between a user and one or more viewers in one social network to another social network. This may be needed as media files and captions may be defined in one social network and uploaded to one or more social networks.

As the media caption is now shared with the social network, all those viewing the photo on the social network may see (to use the example above) the caption "I had lunch at Italiano Restaurant. I had a great time." while the user's friends viewing the photo on the social network may see the caption "I had lunch at Italiano Restaurant with a new date. :) I had a great time.". Thus, the media caption has been customized according to the distribution rules defined by the viewer.

The user's groups may be defined similarly on the user interface and the social network so that when the user desires to customize a caption for the user's friends, the user's friends are defined on the social network.

It is within the scope of the exemplary embodiments for the relationship interpreter to check the user's relationships (family, friends, coworkers, etc.) on the social networks and report back to the user. The user may choose to engage in multiple social networks. As the user uploads a media file from one social network to another social network, a mapping is needed to ensure the target distribution of the media file and caption customized by the user using the relationship manager of the first social media is correctly mapped to the relationship of the second social network. The relationship interpreter presents to the user the mapping of relationships among multiple social networks. The user may then take action to add, delete or modify the relationship mapping to conform with the user's wishes.

Referring to the drawings in more detail, and particularly referring to FIG. 1, there is illustrated a first exemplary embodiment illustrating a first arrangement of the dynamic media caption apparatus. A user's device 102 may remotely connect 104, such as by the internet, to a remote computing device 106 such as a web server. The user's device 102 may be any computing device usable by a user such as a mobile device (shown in FIG. 1), a laptop computer, desk top computer or work station. As shown in FIG. 1, for purposes of illustration and not limitation, a smartphone mobile device 102 is communicating wirelessly with the remote computing device 106. The remote computing device 106 may, in turn, connect 108 to one or more social networks 110A, 110B, 110C. The social networks 110A, 110B, 110C may be any social network that may allow the sharing of media. Some nonlimiting examples of social networks include Facebook, Flickr, Twitter, MySpace and Google+. Social networks may also be referred to as social networking websites.

Included within computing device 106 may be the components of the dynamic media caption apparatus including the user interface 112, the distribution rules engine 114 and distribution manager 116. In a preferred exemplary embodiment, the dynamic media caption apparatus may further include a relationship manager 118 and a relationship interpreter 120 in the computing device 106.

Referring to FIG. 2, there is illustrated a second exemplary embodiment illustrating a second arrangement of the dynamic media caption apparatus. A user's device 102 may remotely connect 204, such as by the internet, to a remote computing device 206 such as a web server. The user's device 202 may be any computing device usable by a user such as a mobile device, a laptop computer, desk top computer or work station. As shown in FIG. 2, for purposes of illustration and not limitation, a desktop computer user device 202 is communicating through a wired connection 204 with the remote computing device 206. The remote computing device 206 may, in turn, connect 208 to one or more social networks 210A, 210B, 210C. The social networks 210A, 210B, 210C may be any social network that may allow the sharing of media including those social networks mentioned with respect to FIG. 1.

Included within computing device 206 may be some of the components of the dynamic media caption apparatus including the distribution rules engine 214 and distribution manager 216. In the exemplary embodiment illustrated in FIG. 2, the user interface 212 may be located in the laptop computer user device 202. In a preferred exemplary embodiment, the dynamic media caption apparatus may further include a relationship manager 218 and a relationship interpreter 220 in the computing device 206.

The exemplary embodiment illustrated in FIG. 2 shows the user interface 212 on the desktop computer user device 202, which may allow the user to manipulate media and captions offline before connecting to the remote computing device 206. It is also within the scope of the exemplary embodiments to have a user interface 212A (shown in dotted lines in FIG. 2) on the remote computing device 206 to enable the use of a computing device that may not have a local version of the user interface to communicate with the remote computing device 206 and share media.

It should be understood that the user device 102, 202 that is used in the exemplary embodiments is unimportant and any user device may be used in either of the exemplary embodiments. Further, the means of communication between the user device 102, 202 and remote computing device 106, 206 is also unimportant to the present invention and may be a wireless or wired connection.

Each of the computing devices 102, 106, 202, 206 may be implemented by a general-purpose computer or a special purpose device such as a hand-held computer. FIG. 3 is a block diagram that illustrates one exemplary hardware environment of the devices 102, 106, 202, 206. The exemplary embodiments may be implemented using a computer 310 comprised of microprocessor means, random access memory (RAM), read-only memory (ROM) and other components. The computer 310 may be a personal computer, server, mainframe computer, hand-held device or other computing device. Resident in the computer 310, or peripheral to it, may be a storage device 314 of some type such as a hard disk drive, floppy disk drive, CD-ROM drive, tape drive or other storage device.

Generally speaking, the software implementation of the exemplary embodiments, program 312 in FIG. 3, may be tangibly embodied in a computer-readable medium such as one of the storage devices 314 mentioned above. The program 312 may comprise instructions which, when read and executed by the microprocessor of the computer 310, may cause the computer 310 to perform the steps necessary to execute the steps or elements of the exemplary embodiments.

Another exemplary embodiment includes a method of creating a dynamic media caption in a social network environment. There is provided a user interface to define syntax and distribution rules in the user interface for a media caption in a social network. There is also provided a distribution rules engine to understand the syntax and distribution rules defined in the user interface for the media caption and output a media caption that is customized according to the distribution rules. There is further provided a distribution manager to translate the customized media caption output by the distribution rules engine to a language understandable by the social network, generate the customized media caption in the language understandable by the social network and output the translated customized media caption to the social network, the customized media caption changing according to the distribution rules and a relationship to the user of a viewer of the media caption on the social network. The method may be implemented by one or more computing devices.

Another exemplary embodiment includes a method of creating a dynamic media caption service for a user using a social network. In the method, there is provided a user interface to define syntax and distribution rules in the user interface accessible by a user in connection with a media caption in a social network, followed by receiving by the user interface a media caption customized by the user using the syntax and distribution rules in the user interface. A distribution rules engine is provided followed by receiving by the distribution rules engine the customized caption and understanding by the distribution rules engine the syntax and distribution rules defined in the user interface for the customized media caption and outputting the customized media caption that is customized by the user according to the distribution rules. A distribution manager is provided. The distribution manager receives and translates the customized media caption output by the distribution rules engine to a language understandable by the social network, generates the customized media caption in the language understandable by the social network and outputs the translated customized media caption to the social network, the customized media caption changing according to the distribution rules and a relationship to the user of a viewer of the media caption on the social network. The method may be implemented by one or more computing devices.

A last exemplary embodiment may include a computer program product for creating a dynamic media caption in a social network environment. The computer program product may include a computer readable storage medium having a computer readable program code embodied therewith. The computer readable program code may include computer readable program code configured to provide a user interface to define syntax and distribution rules in the user interface for a media caption in a social network; computer readable program code configured to provide a distribution rules engine; computer readable program code configured to understand by the distribution rules engine the syntax and distribution rules defined in the user interface for the media caption and computer readable program code configured to output a media caption that is customized according to the distribution rules; computer readable program code configured to provide a distribution manager; and computer readable program code configured to translate by the distribution manager the customized media caption output by the distribution rules engine to a language understandable by the social network, computer readable program code configured to generate the customized media caption in the language understandable by the social network and computer readable program code configured to output the translated customized media caption to the social network, the customized media caption changing according to the distribution rules and a relationship to the user of a viewer of the media caption on the social network.

As will be appreciated by one skilled in the art, aspects of the exemplary embodiments may be embodied as a system, method, service method or computer program product. Accordingly, aspects of the exemplary embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the exemplary embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible or non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the exemplary embodiments may be written in any combination of one or more programming languages, including an object oriented programming language such as Java, Smalltalk, C++ or the like and conventional procedural programming languages, such as the "C" programming language or similar programming languages or even Microsoft Excel/Access. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the exemplary embodiments have been described above with reference to flowchart illustrations and/or block diagrams of methods, apparatus (systems) and computer program products according to the exemplary embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and/or block diagrams in the Figures illustrate the architecture, functionality, and operation of possible implementations of systems, methods, service methods and computer program products according to the exemplary embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. Dynamic media caption apparatus for customizing a media caption input by a user in a social network environment comprising:

a user interface to directly input the media caption by the user and the user interface to define syntax symbols to separate the media caption into segments and distribution rules for the media caption posted to a digital media in a social network, the media caption being descriptive of the digital media, the distribution rules and the syntax symbols defining at least one first group of persons who may see all of the media caption when viewing the digital media and at least one second group of persons who may see only a part of the media caption when viewing the digital media;

a distribution rules engine to understand the syntax symbols and the distribution rules defined in the user interface for the media caption and output a media caption in a coded media file containing logical decision checkpoints for each segment of the media caption set off by the syntax symbols and for the distribution of each segment to a distribution manager that is customized to the digital media according to the distribution rules so that the customized media caption allows the at least one first group of persons to see all of the media caption when viewing the digital media and allows the at least one second group of persons to see only the part of the media caption when viewing the digital media; and the distribution manager to translate the customized media caption output in the coded media file by the distribution rules engine to a language understandable by the social network, generate the customized media caption in the language understandable by the social network and output the translated customized media caption with the digital media to the social network, the customized media caption posted to the digital media changing according to the distribution rules and changing according to a relationship between the user and a viewer of the digital media on the social network;

wherein the apparatus is implemented by one or more computing devices.

2. The dynamic media caption apparatus of claim 1 further comprising a relationship manager to manage the relationship between the user and the viewer on the social network wherein the distribution manager queries the relationship manager on the relationship between the user and the viewer in order to generate all of the customized media caption posted with the digital media for the at least one first group and generate only the part of the customized media caption posted with the digital media for the at least one second group.

3. The dynamic media caption apparatus of claim 1 further comprising a relationship interpreter to translate the relationship between the user and the viewer on one social network to a second social network.

4. The dynamic media caption apparatus of claim 1 wherein the syntax symbols are predefined in the user interface and the user defines the distribution rules in the user interface.

5. The dynamic media caption apparatus of claim 1 wherein the user defines the syntax symbols and distribution rules in the user interface.

6. A method of creating a dynamic media caption customizing a media caption input by a user in a social network environment comprising:

providing a user interface to directly input the media caption by the user and the user interface to define syntax symbols to separate the media caption into segments and distribution rules in the user interface for the media caption posted to a digital media in a social network, the media caption being descriptive of the digital media, the distribution rules and the syntax symbols defining at least one group of persons who may see all of the media caption when viewing the digital media and at least one second group of persons who may see only a part of the media caption when viewing the digital media;

providing a distribution rules engine;

understanding by the distribution rules engine the syntax symbols and the distribution rules defined in the user interface for the media caption and outputting a media caption in a coded media file containing logical decision checkpoints for each segment of the media caption set off by the syntax symbols and for the distribution of each segment to a distribution manager that is customized to the digital media according to the distribution rules so that the customized media caption allows the at least one first group of persons to see all of the media caption when viewing the digital media and allows the at least one second group of persons to see only the part of the media caption when viewing the digital media;

providing the distribution manager; and translating by the distribution manager the customized media caption output in the coded media file by the distribution rules engine to a language understandable by the social network, generating the customized media caption in the language understandable by the social network and outputting the translated customized media caption with the digital media to the social network, the customized media caption posted to the digital media changing according to the distribution rules and changing according to a relationship between the user and a viewer of the digital media on the social network;

wherein the method is implemented by one or more computing devices.

7. The method of claim 6 further comprising providing a relationship manager and managing by the relationship manager the relationship between the user and the viewer on the social network and wherein the distribution manager querying the relationship manager on the relationship between the user and the viewer for generating all of the customized media caption posted to the digital media for the at least one first group and generating only the part of the customized media caption posted with the digital media for the at least one second group.

8. The method of claim 6 further comprising providing a relationship interpreter and translating by the relationship interpreter the relationship between the user and the viewer on one social network to a second social network.

9. The method of claim 6 wherein the syntax symbols are predefined in the user interface and further comprising allowing the user to define the distribution rules in the user interface.

10. The method of claim 6 further comprising allowing the user to define the syntax symbols and distribution rules in the user interface.

11. A method of creating a dynamic media caption service customizing a media caption input by a user using a social network comprising:

providing a user interface to directly input the media caption by the user and the user interface to define syntax symbols to separate the media caption into segments and distribution rules in the user interface accessible by the user in connection with a media caption posted to a digital media in a social network, the media caption being descriptive of the digital media, the distribution rules and the syntax symbols defining at least one first group of persons who may see all of the media caption when viewing the digital media and at least one second group of persons who may see only a part of the media caption when viewing the digital media;

receiving by the user interface the media caption customized by the user using the syntax and distribution rules in the user interface;

providing a distribution rules engine;

receiving by the distribution rules engine the customized caption and understanding by the distribution rules engine the syntax symbols and distribution rules defined in the user interface for the customized media caption and outputting the customized media caption in a coded media file containing logical decision checkpoints for each segment of the media caption set off by the syntax symbols and for the distribution of each segment to a distribution manager that is customized by the user with the digital media according to the distribution rules so that the customized media caption allows the at least one first group of persons to see all of the media caption when viewing the digital media and allows the at least one second group of persons to see only the part of the media caption when viewing the digital media;

providing the distribution manager; and receiving by the distribution manager and translating by the distribution manager the customized media caption output in the coded media file by the distribution rules engine to a language understandable by the social network, generating the customized media caption in the language understandable by the social network and outputting the translated customized media caption with the digital media to the social network, the customized media caption posted to the digital media changing according to the distribution rules and changing according to a relationship between the user and a viewer of the digital media on the social network;

wherein the method is implemented by one or more computing devices.

12. The method of claim 11 further comprising providing a relationship manager and managing by the relationship manager the relationship between the user and the viewer on the social network and wherein the distribution manager querying the relationship manager on the relationship between the user and the viewer for generating all of the customized media caption for the at least one first group and generating only the part of the customized media caption posted with the digital media for the at least one second group.

13. The method of claim 11 further comprising providing a relationship interpreter and translating by the relationship interpreter the relationship between the user and the viewer on one social network to a second social network.

14. The method of claim 11 wherein the syntax symbols are predefined in the user interface and further comprising allowing the user to define the distribution rules in the user interface.

15. The method of claim 11 further comprising allowing the user to define the syntax symbols and distribution rules in the user interface.

16. A computer program product for creating a dynamic media caption customizing a media caption input by a user in a social network environment, the computer program product comprising:

a non-transitory computer readable storage medium having a computer readable program code embodied therewith, the computer readable program code comprising:

computer readable program code configured to provide a user interface to directly input the media caption by the user and the user interface to define syntax symbols to separate the media caption into segments and distribution rules in the user interface for the media caption posted to a digital media in a social network, the media caption being descriptive of the digital media and not being geotagged, the distribution rules and the syntax symbols defining at least one first group of persons who may see all of the media caption when viewing the digital media and at least one second group of persons who may see only a part of the media caption when viewing the digital media;

computer readable program code configured to provide a distribution rules engine;

computer readable program code configured to understand by the distribution rules engine the syntax symbols and distribution rules defined in the user interface for the media caption and computer readable program code configured to output a media caption in a coded media file containing logical decision checkpoints for each segment of the media caption set off by the syntax symbols and for the distribution of each segment to a distribution manager that is customized to the digital media according to the distribution rules, the distribution rules defining at least one first group of persons who may see all of the media caption when viewing the digital media and at least one second group of persons who may see only a part of the media caption when viewing the digital media;

computer readable program code configured to provide the distribution manager; and computer readable program code configured to translate by the distribution manager the customized media caption output in the coded media file by the distribution rules engine to a language understandable by the social network, computer readable program code configured to generate the customized media caption in the language understandable by the social network and computer readable program code configured to output the translated customized media caption with the digital media to the social network, the customized media caption posted to the digital media changing according to the distribution rules and changing according to a relationship between the user and a viewer of the digital media on the social network.

17. The computer program product of claim 16 further comprising computer readable program code configured to provide a relationship manager to manage the relationship between the user and the viewer on the social network and further comprising computer readable program code configured to query the relationship manager by the distribution manager on the relationship between the user and the viewer in order for the computer readable program code to generate all of the customized media caption for the at least one first group and generating only the part of the customized media caption posted with the digital media for the at least one second group.

18. The computer program product of claim 16 further comprising computer readable program code configured to provide a relationship interpreter and computer readable program code configured to translate by the relationship interpreter a relationship between the user and the viewer on one social network to a second social network.

19. The computer program product of claim 16 wherein the syntax symbols are predefined in the user interface and further comprising computer readable program code configured to allow the user to define the distribution rules in the user interface.

20. The computer program product of claim 16 further comprising computer readable program code configured to allow the user to define the syntax symbols and distribution rules in the user interface.

* * * * *